(12) United States Patent
Thanayankizil et al.

(10) Patent No.: US 9,462,626 B1
(45) Date of Patent: Oct. 4, 2016

(54) MAINTAINING A MIRRORING SESSION BETWEEN A VEHICLE AND A MOBILE DEVICE

(71) Applicant: GM Global Technology Operations LLC, Detroit, MI (US)

(72) Inventors: Lakshmi V. Thanayankizil, Rochester Hills, MI (US); Fan Bai, Ann Arbor, MI (US); Robert A. Hrabak, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/643,829

(22) Filed: Mar. 10, 2015

(51) Int. Cl.
*H04M 11/10* (2006.01)
*H04W 76/04* (2009.01)
*H04B 1/3822* (2015.01)
*H04L 12/751* (2013.01)

(52) U.S. Cl.
CPC ......... *H04W 76/045* (2013.01); *H04B 1/3822* (2013.01); *H04L 45/026* (2013.01)

(58) Field of Classification Search
CPC . H04W 76/045; H04B 1/3822; H04L 45/026
USPC .......................................... 455/414.1, 412.2
See application file for complete search history.

(56) References Cited

U.S. PATENT DOCUMENTS

| | | | | |
|---|---|---|---|---|
| 8,478,242 B2* | 7/2013 | Mathew | ................ | H04M 1/665 379/204.01 |
| 2005/0215241 A1* | 9/2005 | Okada | ................... | H04W 48/04 455/414.1 |
| 2009/0059899 A1* | 3/2009 | Bendelac | ............ | H04L 12/5692 370/352 |
| 2015/0004946 A1* | 1/2015 | Schmidt | ................ | H04L 65/601 455/412.2 |
| 2015/0365521 A1* | 12/2015 | Lindner | ............ | H04W 52/0277 455/405 |
| 2016/0034238 A1* | 2/2016 | Gerlach | ............. | G06F 3/04817 345/1.1 |

* cited by examiner

*Primary Examiner* — Qutbuddin Ghulamali
(74) *Attorney, Agent, or Firm* — Christopher DeVries; Reising Ethington P.C.

(57) ABSTRACT

A communication system that includes a vehicle and a mobile device, and a method of continuing a mirroring session between the mobile device and a display in the vehicle, which is carried out using the communication system. The method includes the steps of: establishing the mirroring session between the mobile device and the vehicle display; providing mirroring data from the mobile device to the vehicle display via the mirroring session; receiving at the mobile device a keep-alive message from the vehicle display; and in response to receiving the keep-alive message, continuing the mirroring session following an initiation of an inactivity mode of the mobile device.

20 Claims, 4 Drawing Sheets

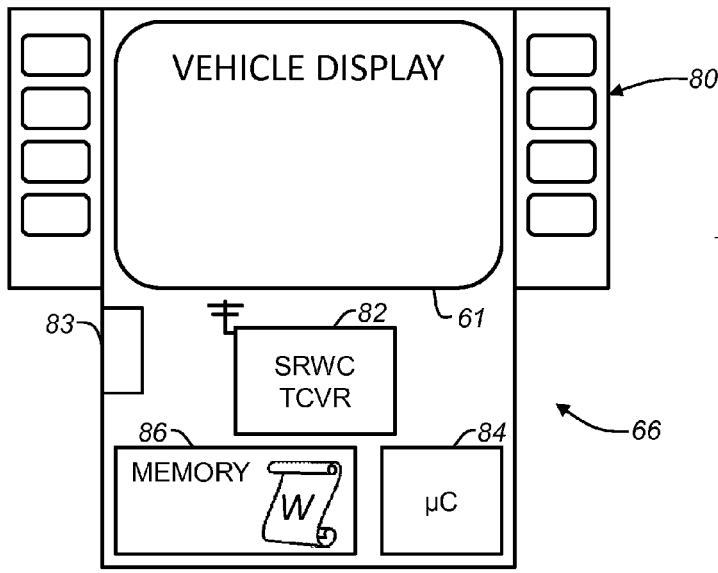
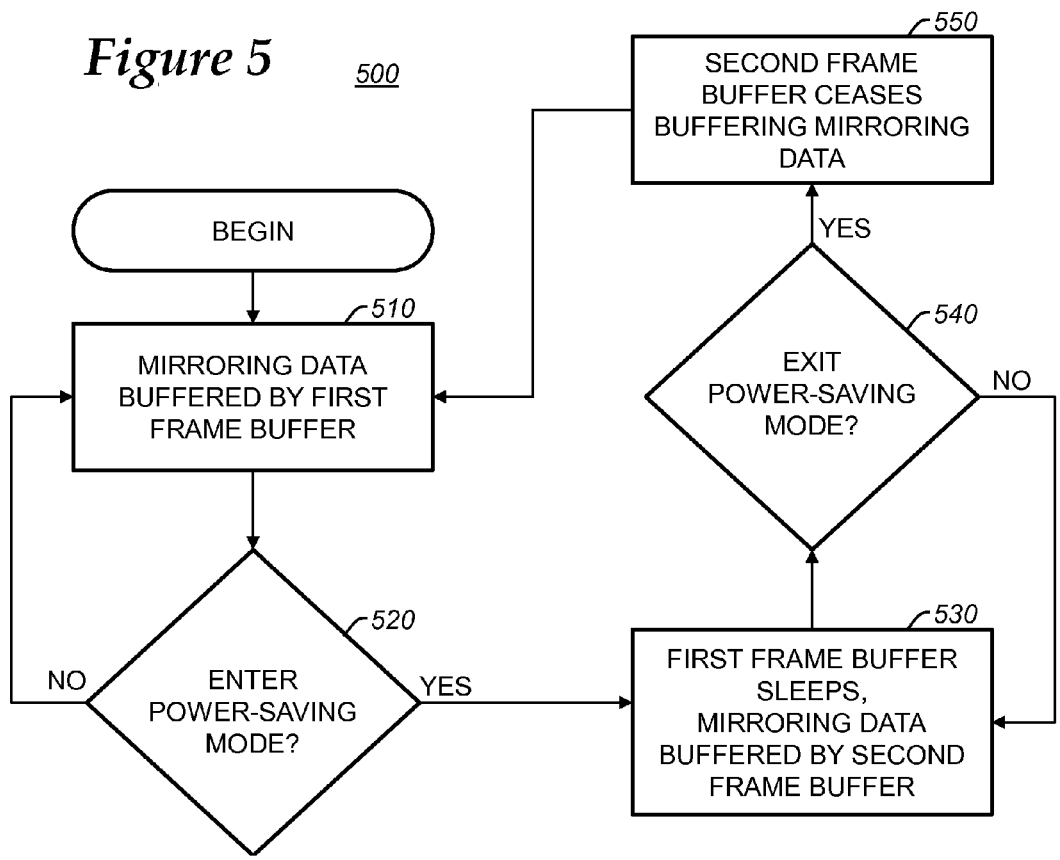
*Figure 3*
*Figure 5*

MAINTAINING A MIRRORING SESSION BETWEEN A VEHICLE AND A MOBILE DEVICE

TECHNICAL FIELD

The present invention relates to maintaining data communication between a mobile device and a vehicle display, and more particularly, to maintaining a data communication session when a portion of the mobile device becomes temporarily inactive.

BACKGROUND

MirrorLink™, promoted by the Car Connectivity Consortium, provides connectivity between a Smartphone and a vehicle's infotainment system. Using a USB, Bluetooth, or Wi-Fi connection and MirrorLink™, applications on the Smartphone may be available and/or accessible via a screen on the vehicle's infotainment system. For example, applications stored and executed on the mobile device can be viewed on the infotainment system display and operated using infotainment system controls (e.g., MirrorLink™ refers to this as Virtual Network Computing or VNC).

Miracast™, a certification program associated with the Wi-Fi Alliance, defines a peer-to-peer protocol that may be used to connect a user's Smartphone to an external monitor or television, such as the infotainment system display in the vehicle. Using Wi-Fi Direct, Miracast™ then can be used to stream 1080p video from the Smartphone to the display.

Thus, both MirrorLink™ and Miracast™ can be used to enable a data communication session between a Smartphone and a vehicle display where the Smartphone provides imagery data to the display for vehicle users. However in both systems, should the Smartphone enter an inactivity mode (e.g., to conserve power), the session will be terminated and, as a result, the imagery data provided by the Smartphone will cease. Thus, there is a need to preserve the session even when the Smartphone initiates the inactivity mode.

SUMMARY

According to an embodiment of the invention, there is provided a method of continuing a mirroring session between a mobile device and a vehicle display. The method includes the steps of: establishing the mirroring session between the mobile device and the vehicle display; providing mirroring data from the mobile device to the vehicle display via the mirroring session; receiving at the mobile device a keep-alive message from the vehicle display; and in response to receiving the keep-alive message, continuing the mirroring session following an initiation of an inactivity mode of the mobile device According to another embodiment of the invention, there is provided a method of maintaining a mirroring session between a mobile device and a vehicle display. The method includes the steps of: establishing a communication link between the mobile device and the vehicle display; establishing the mirroring session over the communication link; receiving mirroring data via the mirroring session; displaying the mirroring data using the vehicle display; and in response to receiving the mirroring data, providing a keep-alive message from the vehicle display to the mobile device via the communication link that maintains the mirroring session following a triggering of an inactivity mode at the mobile device.

BRIEF DESCRIPTION OF THE DRAWINGS

One or more embodiments of the invention will hereinafter be described in conjunction with the appended drawings, wherein like designations denote like elements, and wherein:

FIG. 3 is a schematic diagram of a vehicle head unit shown in FIG. 1;

FIG. 5 is a flow diagram of another method of maintaining the mirroring session between the mobile device and the vehicle head unit.

DETAILED DESCRIPTION OF THE ILLUSTRATED EMBODIMENT(S)

The method described below inhibits an undesired termination of a mirroring session between a mobile device and a vehicle display. The mirroring session is a type of data communication session that enables mirroring data, which can be displayed on the mobile device, to be provided to a vehicle user via the vehicle display. First, a communication link between the mobile device and display is established using one of a variety of means; e.g., a wired link (e.g., USB) or a wireless link (e.g., short-range wireless communication such as Wi-Fi, Wi-Fi Direct, or Bluetooth). The mirroring session then may be established and maintained via the communication link. A mirroring session includes any data session which provides mirroring data. And mirroring data can include, among other things, imagery data such as digital graphics and/or streaming video data. In some implementations, mirroring data further includes control data or other data types, but this is not required. For example, in a Miracast™ implementation, the mirroring data may comprise only imagery data, whereas in a MirrorLink™ implementation, both imagery data and control data may be communicated during the mirroring session. An undesired termination can occur when the mobile device enters an inactivity mode (e.g., such as a power-saving mode). During this mode, the mobile device temporarily pauses or causes to sleep one or more internal systems (e.g., circuits, components, applications, etc.). When this occurs, the mirroring session will terminate causing a disruption of mirroring data at the vehicle display. The methods disclosed below override or reconfigure one or more internal systems in the mobile device to prevent this undesired termination of the mirroring session.

Communications System—

Figure 1:
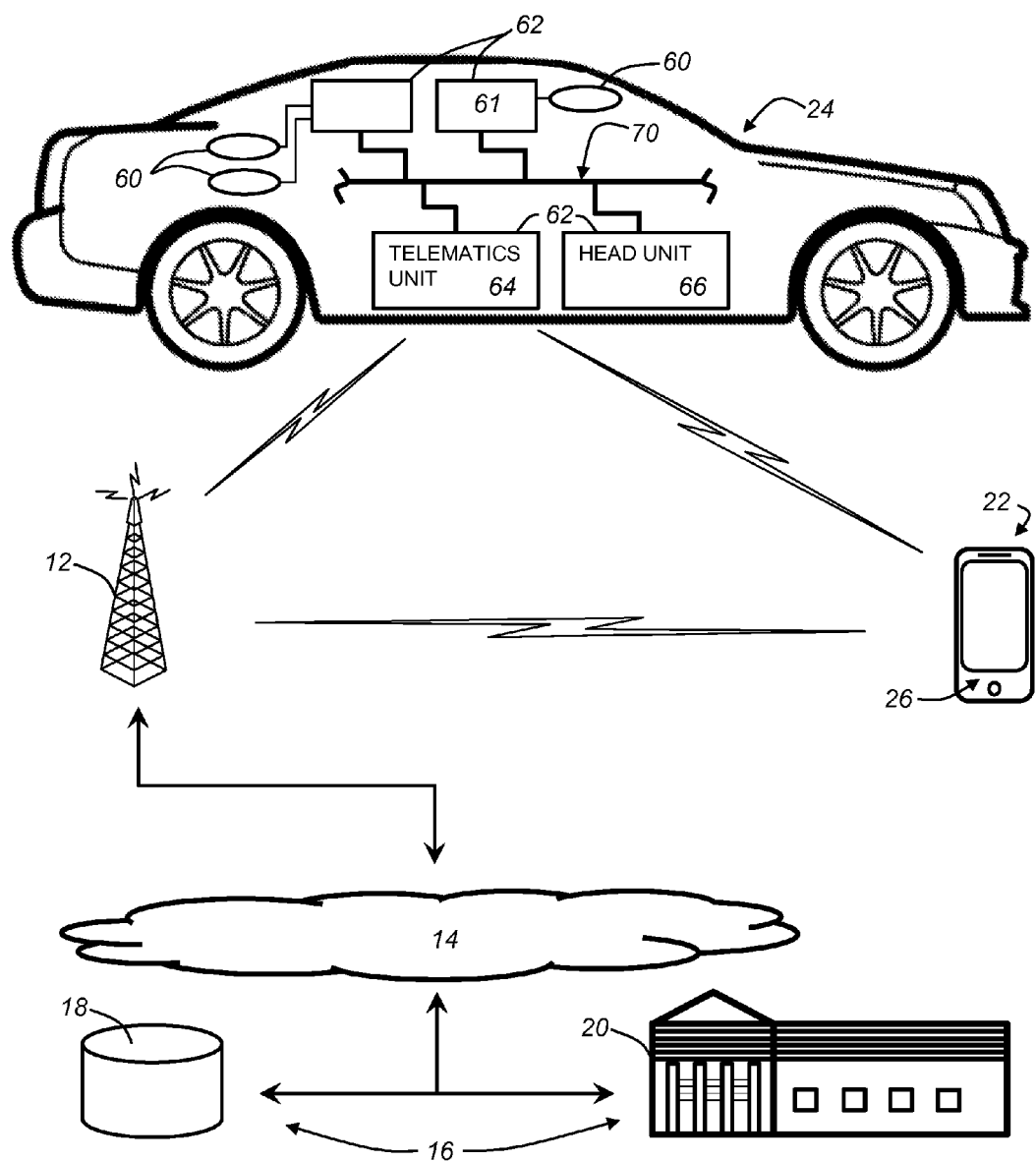
FIG. 1 is a block diagram depicting an embodiment of a communications system that is capable of utilizing the method disclosed herein.

With reference to FIG. 1, there is shown an operating environment that comprises a mobile vehicle communications system 10 and that can be used to implement the method disclosed herein. Communications system 10 generally includes: one or more wireless carrier systems 12; a land communications network 14; a backend system 16 that includes at least one of a remote server 18 or a data service center 20; a mobile device 22; and a vehicle 24. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Wireless carrier system 12 is preferably a cellular telephone system that includes a plurality of cell towers (only is one shown), one or more mobile switching centers (MSCs) (not shown), as well as any other networking components required to connect wireless carrier system 12 with land network 14. Each cell tower includes sending and receiving antennas and a base station, with the base stations from different cell towers being connected to the MSC either directly or via intermediary equipment such as a base station controller. Cellular system 12 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 12. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 12, a different wireless carrier system in the form of satellite communication can be used to provide uni-directional or bi-directional communication with the vehicle. This can be done using one or more communication satellites and an uplink transmitting station. Uni-directional communication can be, for example, satellite radio services, wherein programming content (news, music, etc.) is received by transmitting station, packaged for upload, and then sent to the satellite, which broadcasts the programming to subscribers. Bi-directional communication can be, for example, satellite telephony services using satellite to relay telephone communications between the vehicle 24 and uplink transmitting station. If used, this satellite telephony can be utilized either in addition to or in lieu of wireless carrier system 12.

Land network 14 may be a conventional land-based telecommunications network that is connected to one or more landline telephones and connects wireless carrier system 12 to backend system 16. For example, land network 14 may include a public switched telephone network (PSTN) such as that used to provide hardwired telephony, packet-switched data communications, and the Internet infrastructure. One or more segments of land network 14 could be implemented through the use of a standard wired network, a fiber or other optical network, a cable network, power lines, other wireless networks such as wireless local area networks (WLANs), or networks providing broadband wireless access (BWA), or any combination thereof. Furthermore, data service center 20 need not be connected via land network 14, but could include wireless telephony equipment so that it can communicate directly with a wireless network, such as wireless carrier system 12.

Remote server 18 can be one of a number of computers accessible via a private or public network such as the Internet. Each such server 18 can be used for one or more purposes, such as a web server accessible via land network 14 and/or wireless carrier 12. Other such accessible servers 18 can be, for example: a service center computer where diagnostic information and other vehicle data can be uploaded from the vehicle 24; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 24 or data service center 20, or both. Remote server 18 can also be used for providing Internet connectivity such as DNS services or as a network address server that uses DHCP or other suitable protocol to assign an IP address to the vehicle 24.

Data service center 20 is designed to provide the vehicle 24 with a number of different system back-end functions and generally includes one or more switches, servers, databases, live advisors, as well as an automated voice response system (VRS), all of which are known in the art. These various data service center components are preferably coupled to one another via a wired or wireless local area network. Switch, which can be a private branch exchange (PBX) switch, routes incoming signals so that voice transmissions are usually sent to either the live adviser by regular phone or to the automated voice response system using VoIP. The live advisor phone can also use VoIP; VoIP and other data communication through the switch may be implemented via a modem connected between the switch and network. Data transmissions are passed via the modem to server and/or database. Database can store account information such as subscriber authentication information, vehicle identifiers, profile records, behavioral patterns, and other pertinent subscriber information. Data transmissions may also be conducted by wireless systems, such as 802.11x, GPRS, and the like. Although one embodiment has been described as it would be used in conjunction with a manned data service center 20 using a live advisor, it will be appreciated that the data service center can instead utilize VRS as an automated advisor or, a combination of VRS and a live advisor can be used.

Mobile device 22 may be any electronic device capable of cellular voice and/or data calls across a wide geographic area where transmissions are facilitated by the wireless carrier system 12. It may be configured to provide cellular services according to a subscription agreement with a third-party facility such as a wireless service provider (WSP). In addition, mobile device 22 may be electronically coupled to the vehicle 24 by wire (e.g., USB) or wirelessly via short-range wireless communication (SRWC) (e.g., Wi-Fi Direct, Bluetooth, etc.).

Figure 2:
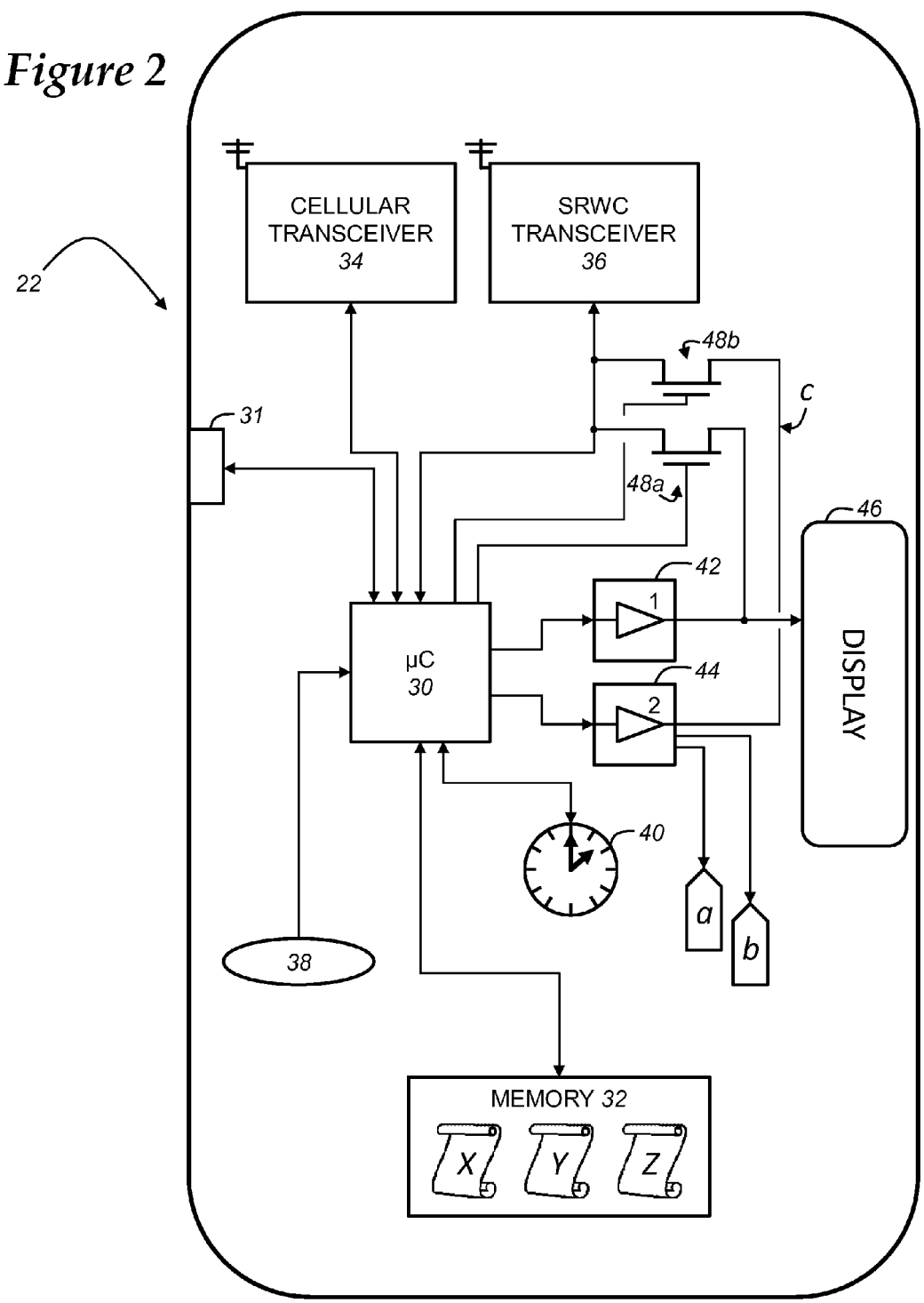
FIG. 2 is a schematic diagram of a mobile device shown in FIG. 1.

Mobile device 22 includes a user input/output (I/O) interface 26, and as shown in greater detail in FIG. 2, may include one or more processors 30 configured to execute an operating system (OS) and one or more software applications X, Y, Z, etc. stored on mobile device memory 32. Using an application (e.g., application X), a vehicle user may remotely control or communicate with vehicle 24 or the backend system 16 (e.g., via cellular communication, SRWC, or both). For example, application X may enable the user to remotely lock/unlock vehicle doors, turn the vehicle on/off, check the vehicle tire pressures, fuel level, oil life, etc. According to one embodiment, application Y may be configured to maintain a mirroring session established between the mobile device and a vehicle display 61 (FIG. 1) when the mobile device 22 enters an inactivity mode—thus, as will be described below, application Y may perform at least some of the method steps described herein.

Processor 30 can be any type of device capable of processing electronic instructions including microprocessors, microcontrollers, host processors, controllers, vehicle communication processors, and application specific integrated circuits (ASICs). Processor 30 executes various types of digitally-stored instructions, such as software or firmware programs stored in memory 32, which enable mobile device 22 to execute a number of functions and/or applications. For instance, processor 30 can execute programs or process data to carry out at least a part of the method discussed herein.

The memory 32 may include any suitable non-transitory computer usable or readable medium computer, which include one or more storage devices or articles. Exemplary non-transitory computer usable storage devices include conventional computer system RAM (random access memory), ROM (read only memory), and EPROM (erasable, programmable ROM), EEPROM (electrically erasable, programmable ROM).

In addition to processor 30 and memory 32, the mobile device may include a USB port or connector 31, a cellular transceiver 34, a short range wireless communication (SRWC) transceiver 36, one or more sensors 38 (e.g., motion sensors, tactile sensors, touch-screen sensors, etc.), a clock 40, a first frame buffer 42, a second frame buffer 44, a display 46, and one or more switches or enabling devices 48a, 48b. In some implementations, the sensor(s) 38 and display 46 may be part of the user I/O interface 26.

As shown in FIG. 2, the processor 30 may be coupled directly and electrically to each of the following devices: the USB port 31, the cellular transceiver 34, the SRWC transceiver 36, the sensor(s) 38, memory 32, the clock 40, the first frame buffer 42, the second frame buffer 44, the switch 48a, and the switch 48b. The first frame buffer 42 may be coupled electrically to the display 46 and also to SRWC transceiver 36 via switch 48a; i.e., when switch 48a is activated or enabled by processor 30, the output of the first frame buffer 42 may pass to the SRWC transceiver 36 for transmission to display 61 in the vehicle 24. The second frame buffer 44 may be coupled various functions (represented as a, b, and c). Functions a and b are representative of any background process or application; e.g., processes or applications which may occur in the background while display 46 presents different data (e.g., mirroring data) to a user of the mobile device 22. Function c represents a specific process; namely, the second frame buffer 44 is coupled to switch 48b, which when activated or enabled by processor 30, allows the output of the second frame buffer 44 to pass to the SRWC transceiver 36 for transmission to display 61 in the vehicle 24. As will be explained in greater detail below, according to one implementation, when the mobile device 22 enters an inactivity mode, a hand-off may occur from the first frame buffer 42 to the second frame buffer 44; here, the second frame buffer 44 may continue buffering mirroring data while the first frame buffer 42 becomes inactive.

Non-limiting examples of the mobile device 22 include a cellular telephone, a personal digital assistant (PDA), a Smart phone, a personal laptop computer or tablet computer having two-way communication capabilities, a netbook computer, a notebook computer, or any suitable combinations thereof. The mobile device 22 may be used inside or outside of vehicle 24 by a vehicle user who may be a vehicle driver or passenger. It should be appreciated that the user does not need to have ownership of the mobile device 22 or the vehicle 24 (e.g., the vehicle user may be an owner or a licensee of either or both).

Returning to FIG. 1, vehicle 24 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Vehicle 24 may include electronics (some not shown) such as a microphone, one or more pushbuttons or other control inputs, a visual display, various vehicle sensors 60, and a number of vehicle system modules (VSMs) 62 such as an audio system and a GPS module. In some implementations, the VSMs 62 of vehicle 24 include one or more vehicle displays 61, a telematics unit 64, and/or a head unit 66. Some of the electronics can be connected directly to the VSMs 62 such as, for example, the sensors 60, the microphone, and/or pushbutton(s), whereas others may be indirectly connected using one or more communication network connections 70.

Communication network connection 70 includes any wired or wireless intra-vehicle communications system for connecting or coupling the VSMs 62 and vehicle electronics to one another. According to one embodiment, the network connection 70 comprises a communications bus and/or an entertainment bus. Examples of suitable wired network connections include a controller area network (CAN), a media oriented system transfer (MOST), a local interconnection network (LIN), a local area network (LAN), and other appropriate connections such as Ethernet, Audio-Visual Bridging (AVB), or others that conform with known ISO, SAE and IEEE standards and specifications, to name but a few. In other embodiments, the network connection 70 may comprise any wireless intra-vehicle communication system such as a closed or secure Wi-Fi or Bluetooth connection.

Vehicle displays 61 include any display and/or monitor in vehicle 24. The display may be a graphics display, such as a touch-screen or a heads-up display (e.g., reflected off of a vehicle windshield). Displays 61 may be output-only devices or may be Smart-devices comprising processors, memory, and specifically configured application software. Non-limiting examples include any display located in the center-stack module (CSM) or console, any display coupled to a vehicle headliner or passenger seat, and any detachable and/or stowable vehicle display.

Telematics unit 64 can be an OEM-installed (embedded) or aftermarket device that is installed in the vehicle and that enables wireless voice and/or data communication over wireless carrier system 12 and via wireless networking. This enables the vehicle 24 to communicate with data service center 20, other telematics-enabled vehicles (not shown), or some other entity or device (such as mobile device 22). The telematics unit preferably uses radio transmissions to establish a communications channel (a voice channel and/or a data channel) with wireless carrier system 12 so that voice and/or data transmissions can be sent and received over the channel. By providing both voice and data communication, telematics unit 64 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the data service center 20) and data communication (e.g., to provide GPS location data or vehicle diagnostic data to the data service center 20), the system can utilize a single call over a voice channel and switch as needed between voice and data transmission over the voice channel, and this can be done using techniques known to those skilled in the art. Cellular communication using the telematics unit 64 may be carried out over the wireless carrier system 12 using a wireless service provider (WSP); and it should be appreciated that the WSP associated with the telematics unit 64 need not be the same WSP associated with the mobile device 22.

According to one embodiment, telematics unit 64 utilizes cellular communication according to either GSM, CDMA, or LTE standards and thus includes a standard cellular chipset for voice communications like hands-free calling, a wireless modem for data transmission, an electronic processing device, one or more digital memory devices, and a dual antenna. It should be appreciated that the modem can either be implemented through software that is stored in the telematics unit and is executed by processor, or it can be a separate hardware component located internal or external to telematics unit 64. The modem can operate using any number of different standards or protocols such as LTE, EVDO, CDMA, GPRS, and EDGE. Wireless networking between the vehicle and other networked devices can also be carried out using telematics unit 64. For this purpose, telematics unit 64 can be configured to communicate wirelessly according to one or more wireless protocols, including short range wireless communication (SRWC) such as any of the IEEE 802.11 protocols, WiMAX, ZigBee™, Wi-Fi direct, Bluetooth, or near field communication (NFC). When used for packet-switched data communication such as TCP/IP, the telematics unit 64 can be configured with a static IP address or can set up to automatically receive an assigned IP address from another device on the network such as a router or from a network address server.

Telematics unit 64 can be used to provide a diverse range of vehicle services that involve wireless communication to and/or from the vehicle. Such services include: turn-by-turn directions and other navigation-related services that are provided in conjunction with the GPS-based vehicle navigation module; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 64, but are simply an enumeration of some of the services that the telematics unit is capable of offering. Furthermore, it should be understood that at least some of the aforementioned modules could be implemented in the form of software instructions saved internal or external to telematics unit 64, they could be hardware components located internal or external to telematics unit 64, or they could be integrated and/or shared with each other or with other systems located throughout the vehicle, to cite but a few possibilities. In the event that the modules are implemented as VSMs 62 located external to telematics unit 64, they could utilize the network connection 70 (e.g., a vehicle bus) to exchange data and commands with the telematics unit.

Head unit 66, which is illustrated in greater detail in FIG. 3, comprises a user interface 80 for input/output (I/O) that comprises at least one display 61, a short range wireless communication (SRWC) chipset 82, a USB port or connector 83, one or more processors or processing devices 84, and one or more memory devices 86—just to name a few components. In some embodiments, head unit 66 comprises part or all of the components of audio system; however, this is not required. Using the SRWC chipset 82 or USB port 83, the head unit 66 may connect with portable devices such as mobile device 22 (e.g., using USB, Wi-Fi, Wi-Fi Direct, Bluetooth, etc.). Additionally, the head unit 66 may operate as a Wi-Fi hotspot; e.g., the telematics unit 64 may establish a data call using the wireless carrier system 12, connect to the internet, and provide internet data to the head unit 66 via the network connection 70, which then serves as the hotspot for devices such as mobile device 22.

Processor 84 can be any type of device capable of processing electronic instructions including microprocessors, microcontrollers, host processors, controllers, vehicle communication processors, and application specific integrated circuits (ASICs). Processor 84 executes various types of digitally-stored instructions, such as software or firmware programs stored in memory 86 (e.g., such as application W), which enable head unit 66 to execute a number of functions and/or applications. According to one implementation, when application W is executed by processor 84, a keep-awake message is communicated from the head unit 66 to the mobile device 22 in order to carry out at least a part of the method discussed herein (which is discussed in greater detail below).

The memory 86 may include any suitable non-transitory computer usable or readable medium computer, which include one or more storage devices or articles. Exemplary non-transitory computer usable storage devices include conventional computer system RAM (random access memory), ROM (read only memory), and EPROM (erasable, programmable ROM), EEPROM (electrically erasable, programmable ROM).

Returning again to FIG. 1, other VSMs 62 such as GPS module can receive radio signals from a constellation of GPS satellites. From these signals, the module can determine vehicle position that is used for providing navigation and other position-related services to the vehicle driver. Navigation information can be presented on a vehicle display or can be presented verbally such as is done when supplying turn-by-turn navigation. The navigation services can be provided using a dedicated in-vehicle navigation module (which can be part of GPS module), or some or all navigation services can be done via telematics unit 64, wherein the position information is sent to a remote location for purposes of providing the vehicle with navigation maps, map annotations (points of interest, restaurants, etc.), route calculations, and the like. The position information can be supplied to data service center 20 or other remote computer system, such as computer 18, for other purposes, such as fleet management. Also, new or updated map data can be downloaded to the GPS module from the data service center 20 via the telematics unit 64.

Audio system may include or be coupled to a vehicle user interface and various electronics such as one or more microphones, pushbuttons, and display(s) 61. As used herein, the term 'vehicle user interface' broadly includes any suitable form of electronic device, including both hardware and software components, which is located on the vehicle and enables a vehicle user to communicate with or through a component of the vehicle. Microphone provides audio input to the telematics unit 64 to enable the driver or other occupant to provide voice commands and carry out hands-free calling via the wireless carrier system 12. For this purpose, it can be connected to an on-board automated voice processing unit utilizing human-machine interface (HMI) technology known in the art. The pushbutton(s) allow manual user input into the telematics unit 64 to initiate wireless telephone calls and provide other data, response, or control input. Separate pushbuttons can be used for initiating emergency calls versus regular service assistance calls to the data service center 20. Audio system provides audio output to a vehicle occupant and can be a dedicated, stand-alone system or part of the primary vehicle audio system. According to the particular embodiment shown here, audio system is operatively coupled to one or more network connections 70 (e.g., for purposes of communication, entertainment, and the like) and can provide AM, FM and satellite radio, CD, DVD and other multimedia functionality. This functionality can be provided in conjunction with or independent of the head unit described above.

Apart from the audio system and GPS module, the vehicle 24 can include other vehicle system modules (VSMs) 62 in the form of electronic hardware components that are located throughout the vehicle and typically receive input from one or more sensors and use the sensed input to perform diagnostic, monitoring, control, reporting and/or other functions. Each of the VSMs 62 is coupled by network connection 70 (e.g., a data bus) to the other VSMs, as well as to the telematics unit 64, and can be programmed to run vehicle system and subsystem diagnostic tests. As examples, other VSMs 62 may be an engine control module (ECM) that controls various aspects of engine operation such as fuel ignition and ignition timing, another VSM 62 can be a powertrain control module that regulates operation of one or more components of the vehicle powertrain, and another VSM 62 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle.

As will be appreciated by those skilled in the art, the above-mentioned VSMs 62 are only examples of some of the modules that may be used in vehicle 24. Other implementations are also possible.

Method—

Figure 4:
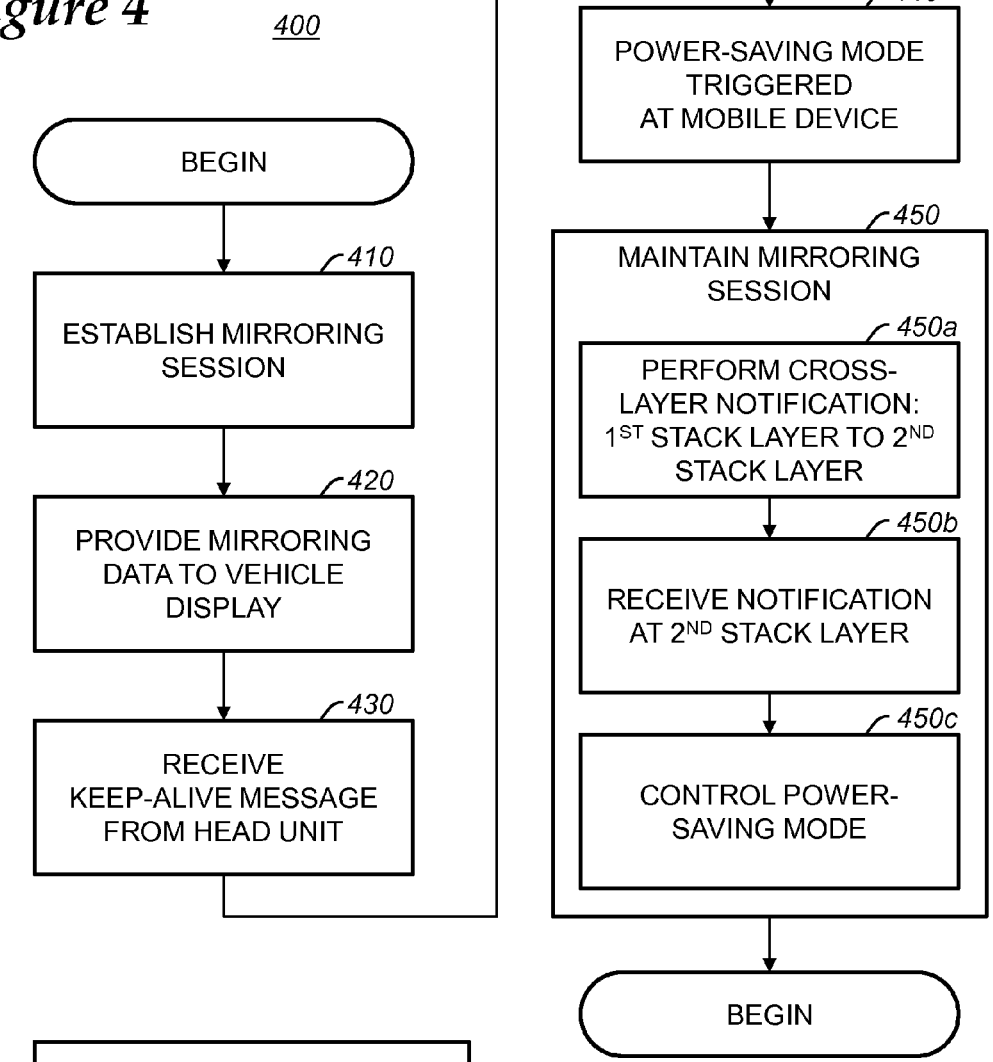
FIG. 4 is a flow diagram of a method of maintaining a mirroring session between the mobile device and the vehicle head unit.

As shown in FIG. 4, a method 400 of continuing or maintaining a mirroring session between mobile device 22 and at least one vehicle display 61 is shown. For purposes of illustration only, the display 61 of the vehicle head unit 66 is described. However, it should be appreciated that any other vehicle display 61 may be used. Also, in some instances, the mobile device 22 may maintain the mirroring session with the head unit 66, and the head unit 66 may communicate the mirroring data to another display 61 (located, e.g., at the vehicle headliner or in the rear of a passenger seat). These and other implementations are contemplated.

Method 400 begins at step 410 by establishing a mirroring session via a wired or wireless communication link. For purposes of illustration only, a short-range wireless communication (SRWC) link between the mobile device and head unit 66 will be described; other communication links are also possible. Techniques for establishing the SRWC link are known—e.g., this may include pairing or bonding, or may occur automatically between two previously paired devices. As the techniques are known, they will not be re-described here. Once the SRWC link is established, the mirroring session may be established over the SRWC link. The mirroring session includes providing mirroring data from a server device (i.e., the mobile device 22) to a client device (e.g., the vehicle display 61, e.g., at head unit 66). As discussed above, mirroring data can include, among other things, imagery data such as digital graphics and/or streaming video data. And in some implementations, mirroring data further includes control data or other data types, but additional data types are not required. Establishing the mirroring session may include one or more communications and acknowledgements (e.g., handshakes) between mobile device 22 and head unit 66, and both devices may have compatible and corresponding firmware or software applications stored and executed thereon (e.g., application Y on mobile device 22 and application W on head unit 66). Skilled artisans will appreciate the hardware, application software, and techniques using such hardware and software needed to establish such a mirroring session. After establishment of the mirroring session in step 410, the method proceeds to step 420.

In step 420, the mobile device provides mirroring data to head unit 66 over the mirroring session. This mirroring data may be provided in real-time or with minimal lag time between its display on the mobile device display 46 and its display on head unit 66. Imagery data may be viewable on display 46 (of the mobile device) as well as on display 61 (of the head unit). For example, if the mirroring session is implemented using Miracast™, streaming video or images being displayed by mobile device 22 may be displayed via display 61. The imagery data may mirror or be virtually identical to the viewable images on the mobile device 22. Or for example, if the mirroring session is implemented using MirrorLink™, streaming video data may be displayed on display 61 and control data (e.g., associated with the streaming video) may be available using user interface 80 of the head unit 66. These are merely examples; other mirroring sessions also may be used. Following step 420, the method proceeds to step 430.

In step 430, a keep-alive message (or maintain mirroring session message) is received at mobile device 22 from head unit 66 via the SRWC link. The keep-alive message may be generated at the head unit 66 using processor 84 and application W. In one embodiment, the keep-alive message is received shortly after the mobile device establishes the mirroring session in step 410—e.g., before the mobile device 22 is likely to enter an inactivity mode (i.e., before such a mode is triggered or initiated). The purpose of the keep-alive message is to prevent the mirroring session from being broken (e.g., to maintain transmission of the mirroring data in the event the mobile device enters the inactivity mode, which may be, e.g., a power-saving mode). Upon receipt, the keep-alive message may be stored in memory 32 and/or used by application Y, as described more below. In at least one implementation, a timestamp correlated with the keep-alive message is determined using clock 40 and also stored in memory 32. The timestamp may be used to maintain the mirroring session for a predetermined period of time. In some implementations, the keep-alive message may be re-sent by head unit 66 (e.g., prior to expiration of the predetermined period of time, if continuance of the mirroring session is desired). Other implementations do not require a timestamp. Following step 430, method 400 proceeds to step 440.

In step 440, an inactivity mode is triggered. In the illustrated implementation, the inactivity mode is a power-saving mode of mobile device 22; however, this is merely an example. The inactivity mode may include any mode of the mobile device that at least temporarily inactivates one or more internal systems of the mobile device—such internal systems include circuits, components, and software applications, just to name a few examples.

During a power-saving mode, a number of electronics and/or software applications are inactivated entered and hibernate or go to sleep. The power-saving mode may be manually actuated or occur automatically. For example, following a predetermined period of time absent user interaction with the mobile device 22, mobile device 22 automatically may enter the power-saving mode to conserve battery power. Here, processor 30 may halt or pause a substantial number of operations or processes while maintaining only a few predetermined operations or processes. Operation of display 46 may be among the halted operations. Later, the mobile device 22 may exit the power-saving mode in response to an awake trigger; e.g., actuation of one or more sensors 38. For example, user contact with the user interface 26 may actuate an awake trigger. Upon exiting the power-saving mode, electronics and applications may be active and fully running again. Following a determination that the power-save mode has been triggered, the method may proceed to step 450.

In step 450 the mirroring session is maintained in spite of the power-saving mode being triggered. It should be appreciated that without the keep-alive message, mobile device 22 will break the SRWC link when the power-saving mode is entered, and without being specially configured, mobile device 22 will break the mirroring session at this time as well. According to one embodiment, receipt of the keep-alive message at mobile device 22 is used to maintain the mirroring session as well.

Figure 6:
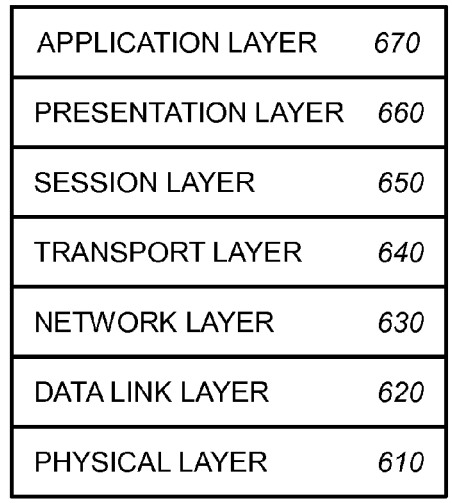
FIG. 6 is a diagram illustrating a model of Open Systems Interconnection (OSI).

The keep-alive message is sent and received over a physical stack layer (e.g., a Wi-Fi layer). The mirroring session is enabled, at least in part, by application Y which is running on an application stack layer. FIG. 6 illustrates a prior art representation of a portion of the Open Systems Interconnection (OSI) model 600 where the physical stack layer 610 is distinct and separated from the application stack layer 670. (Other protocol stack layers also are shown, including the data link stack layer 620, the network stack layer 630, the transport stack layer 640, the session stack layer 650, and the presentation stack layer 660.) Step 450 inhibits the disruption of the mirroring session and comprises one or more sub-steps: 450a, 450b, 450c.

In step 450a, application Y performs a cross-layer notification between a first stack layer (the Wi-Fi layer) and a second stack layer (the application layer). As used herein a cross-layer notification comprises sending a command or message from one layer to another layer of the OSI model 600. The method then proceeds to step 450b.

In step 450b, the command or message is received at the second stack layer; e.g., by application Y. The method then proceeds to step 450c.

Upon receipt of the command or message, step 450c proceeds to control the power-saving mode operations to maintain the mirroring session; this includes preventing necessary internal systems of mobile device 22 from 'going to sleep.' In some instances, application Y overrides normal or pre-programmed power-saving mode operations and processes of the mobile device 22. For example, in a first embodiment, the mirroring session may be maintained while all other normal power-saving mode operations and processes may be carried out. Thus, other applications might 'go to sleep' while application Y does not; and similarly, electronics needed to maintain the mirroring session may remain active while all other circuits and components which normally 'go to sleep' may do so. According to a second embodiment, application Y may completely override all power-saving mode operations and processes. Thus, nothing may be permitted to 'go to sleep' in spite of the power-saving mode trigger. According to yet another embodiment, application Y may override only some degree of operations and processes between the first and second embodiments.

FIG. 5 illustrates another embodiment of maintaining the mirroring session when an inactivity mode is triggered (method 500). According to one implementation, the inactivity mode is a power-saving mode; and this power-saving mode will be used for illustration purposes; however, other inactivity modes also may be used. Prior to the steps shown in method 500, a mirroring session already has been established (e.g., via a SRWC link), mirroring data is already being provided to display 61, and a keep-alive message has been received by mobile device 22.

The method begins with step 510 where mirroring data is buffered by the first frame buffer 42 (on physical layer 610). It should be appreciated that the source of the mirroring data being buffered can vary; e.g., it may be a video or application file previously stored in memory 32 or the mirroring data may be received over a cellular communications link (e.g., via transceiver 34). The buffered mirroring data may be provided to both display 46 as well as SRWC transceiver 36, when the processor 30 enables switch 48a (see the output of first frame buffer 42, FIG. 2). Thus for example, prior to any power-saving mode trigger, imagery data may be mirrored on both display 46 and ultimately display 61 of the head unit 66. Next, method 500 proceeds to step 520.

In step 520 (FIG. 5), the method determines whether to initiate the power-saving mode. If a trigger has been received to enter the power-saving mode, then the method proceeds to step 530. However, if no trigger has been received, then the method loops back and repeats step 510.

When the method proceeds to step 530—i.e., when a power-saving mode trigger is received—in at least one embodiment, the processor 30, as instructed by application Y, commands the first frame buffer 42 'to go to sleep' and commands the second frame buffer 44 (also on physical layer 610) to buffer the mirroring data. In addition, the processor 30 may enable switch 48b so that output from the second frame buffer 44 is provided to the SRWC transceiver 36 and consequently provided to display 61 of the head unit 66 (see the output of second frame buffer 44, FIG. 2). Application Y further may command the second frame buffer 44 to cease operating or processing one or more background applications (e.g., see a and b, FIG. 2). Thus, according to at least one embodiment, the mobile device 22 may conserve power while display 46 is asleep, yet still provide mirroring data to head unit 66. Following step 530, the method may proceed to step 540.

In step 540 (FIG. 5), the method 500 determines whether to exit the power-saving mode. If an awake trigger is received at processor 30, step 540 determines to exit the power-saving mode and proceeds to step 550. If no such trigger is received, then method 500 loops back and repeats step 530.

In step 550, the second frame buffer 44 ceases buffering the mirroring data. In some implementations, the second frame buffer 44 may begin to buffer background applications once again (a and b, FIG. 2). The method then proceeds to step 510, and the first frame buffer 42 buffers the mirroring data again. Thus, the mirroring data again will be viewable by both the mobile device display 46 and the head unit display 61 at the same time. It should be appreciated that the transition or hand-off between the first and second frame buffers 42, 44 may be seamless to the user or viewer of the mirroring data on the display 61. The hand-off process may have a high response rate in order to minimize the number of frames lost during the hand-off process. A seamless hand-off process is contemplated when transitioning from the first frame buffer 42 to the second frame buffer 44, and vice-versa. Thus, in at least one implementation steps 550 and 510 may occur at or about the same moment.

Method 500 is one method where elements at the physical layer 610 (e.g., the buffers 42, 44) may be controlled by software instructions at the application layer 670. However, not all mobile devices 22 are equipped with two or more such frame buffers; e.g., some mobile devices have only one frame buffer (e.g., buffer 42). Here, the application Y may include instructions to override the power-saving mode operations and keep frame buffer 42 active in spite of a power-saving mode trigger. Thus, in at least one implementation, the frame buffer 42 is not allowed to 'go to sleep' during the power-saving mode. This means that the display 46 on the mobile device 22 will continue to display mirroring data that mirrors the data being displayed on head unit 66.

In at least one other embodiment, the application Y may entirely override the power-saving mode. For example, provided mirroring data is being buffered via first frame buffer 42, instructions of application Y may inhibit all power-saving mode operations and processes. This mode may inhibit some power-saving features of mobile device 22, even when a power-saving mode is triggered; however, it also assures no disruptions in the mirrored data. Other implementations are also possible.

Methods 400 and 500 and various embodiments thereof improve the vehicle user experience. The vehicle user experiences less inconvenience because the mirroring session is not periodically interrupted. As a result, the driver of the vehicle may be less distracted. Other technical advantages include preserving the battery life of mobile device 22 (at least in some embodiments) and increasing through-put of devices such as the mobile device 22 and head unit 66. Through-put increases are due at least in part to fewer data transactions occurring when a broken mirror session needs to be re-established. In addition, the methods described herein maintain the mirroring session while also meeting governmental regulatory requirements.

Methods 400 and 500 and various embodiments thereof include instructive steps of application Y or the like (stored in memory 32 and executed by processor 30 of the mobile device 22). In addition, some steps described above include instructive steps commanded by application W (stored in memory 86 and executed by processor 84 of the head unit 66). Thus, it should be appreciated that the methods may be performed by one or more computer programs executable by one or more computing devices. The computer program(s) may exist in a variety of forms both active and inactive. For example, the computer program can exist as software program(s) comprised of program instructions in source code, object code, executable code or other formats; firmware program(s); or hardware description language (HDL) files, just to name a few examples.

Thus there has been described a communication system that includes a vehicle display and a mobile device that can be linked by wire or wirelessly to enable a mirroring session. The mirroring session may be uninterrupted by the occurrence or triggering of an inactivity mode on the mobile device (e.g., such as a power-saving mode). For example, mirroring data transmitted during the mirroring session may not cease simply because the mobile device attempts to at least partially go to sleep. Embodiments have been described which include allowing the mobile device display to go to sleep while continuing the mirroring session, as well as embodiments where the mobile device display does not go to sleep following an inactivity mode but still maintains the mirroring session. Various embodiments are provided in part to enable maintenance of a mirroring session using a wide variety of mobile devices having different hardware and/or software capabilities.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of continuing a mirroring session between a mobile device and a vehicle display, comprising the steps of:
   establishing the mirroring session between the mobile device and the vehicle display;
   providing mirroring data from the mobile device to the vehicle display via the mirroring session;
   receiving at the mobile device a keep-alive message from the vehicle display; and
   in response to receiving the keep-alive message, maintaining the mirror session without interruption using a software application executed by the mobile device following an initiation of an inactivity mode of the mobile device, wherein the software application at least partially overrides, reconfigures, or both, one or more internal systems in the mobile device to prevent termination of the mirroring session.

2. The method of claim 1, wherein the application executed by the mobile device at least partially overrides the inactivity mode.

3. The method of claim 1, further comprising
   receiving the keep-alive message at a first protocol stack layer of the mobile device;
   performing a cross-layer notification associated with the keep-alive message by sending the notification from the first protocol stack layer to a second protocol stack layer of the mobile device; and
   in response to receiving the notification at the second protocol stack layer, continuing the mirroring session following the initiation of the inactivity mode.

4. The method of claim 3, wherein the first protocol stack layer is a Wi-Fi layer.

5. The method of claim 3, wherein the second protocol stack layer is an application layer.

6. The method of claim 5, further comprising sending the cross-layer notification to the application on the application layer of the mobile device.

7. The method of claim 1, wherein the mirroring data is provided using a Miracast™ application or a MirrorLink™ application.

8. The method of claim 1, further comprising:
receiving the keep-alive message at a first protocol stack layer of the mobile device;
performing a cross-layer notification associated with the keep-alive message by sending the notification from the first protocol stack layer to a second protocol stack layer of the mobile device; and
based on the cross-layer notification and following the initiation of the inactivity mode, controlling a first frame buffer that buffers mirroring data in order to continue the mirroring session.

9. The method of claim 8, further comprising:
based on the cross-layer notification and following the initiation of the inactivity mode, controlling a hand-off of the buffering of mirroring data, wherein the hand-off transitions the buffering of mirroring data from the first frame buffer to a second frame buffer.

10. The method of claim 9, further comprising:
receiving an indication of a termination of the inactivity mode; and
based on the indication, controlling a second hand-off of the buffering of mirroring data, wherein the second hand-off transitions the buffering of mirroring data from the second frame buffer to a first frame buffer.

11. The method of claim 1, wherein the inactivity mode is a power-saving mode.

12. The method of claim 1, wherein the keep-alive message is associated with a predetermined period of time, wherein the keep-alive message is received repeatedly at the mobile device to continue the mirroring session.

13. The method of claim 1, wherein the mirroring session is established via a wired or wireless communication link.

14. The method of claim 1, wherein the mirroring data comprises imagery data.

15. The method of claim 14, wherein the mirroring data further comprises control data.

16. The method of claim 1, wherein the vehicle display is part of a vehicle head unit.

17. A method of maintaining a mirroring session between a mobile device and a vehicle display, comprising the steps of:
establishing a communication link between the mobile device and the vehicle display;
establishing the mirroring session over the communication link;
receiving mirroring data via the mirroring session;
displaying the mirroring data using the vehicle display; and
in response to receiving the mirroring data, providing a keep-alive message from the vehicle display to the mobile device via the communication link that maintains the mirroring session following a triggering of an inactivity mode at the mobile device, and wherein in response to the keep-alive message from the vehicle display, the mirroring session is maintained without interruption using a software application executed by the mobile device, wherein the software application overrides, reconfigures, or both, one or more internal systems in the mobile device to prevent termination of the mirroring session.

18. The method of claim 17, wherein a cross-layer notification is performed at the mobile device based on the receipt of the keep-alive message.

19. The method of claim 17, wherein the vehicle display is part of a vehicle head unit.

20. The method of claim 17, wherein the mirroring data is received using a Miracast™ application or a MirrorLink™ application.

* * * * *